Jan. 22, 1963 R. D. BLACK 3,074,182
EDUCATIONAL DEVICES
Filed Sept. 14, 1959 5 Sheets-Sheet 1
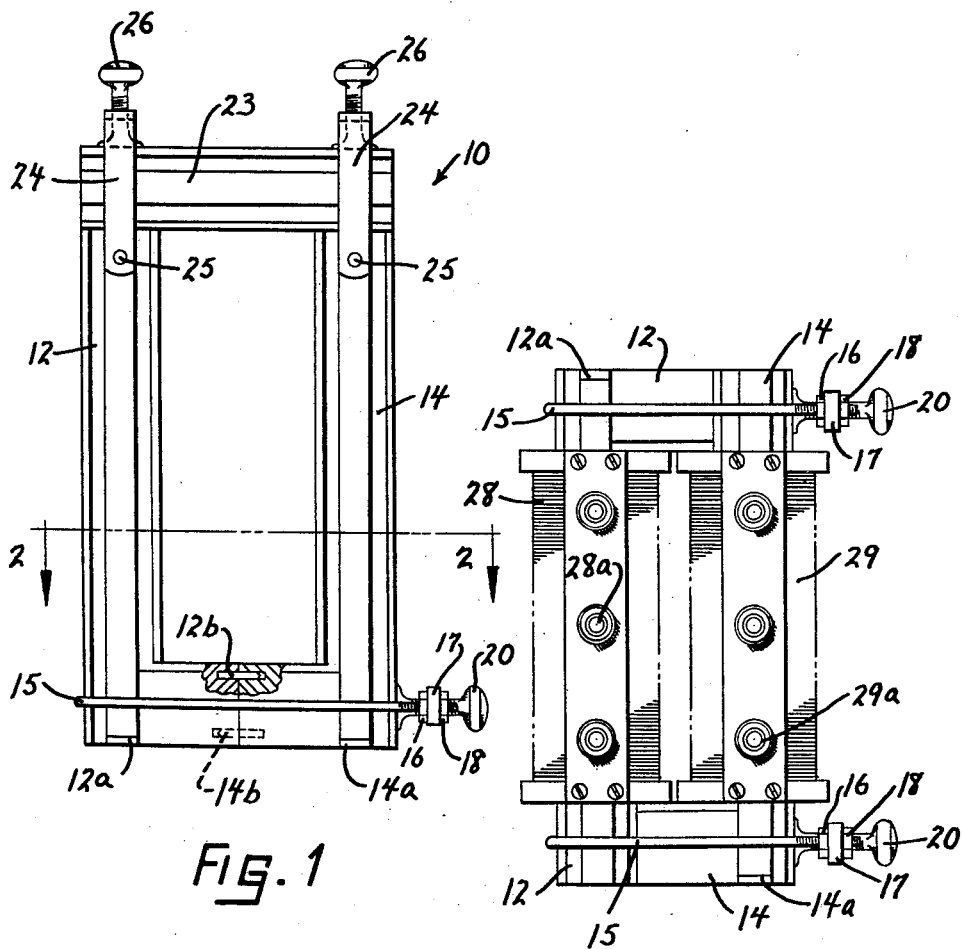
Fig. 1
Fig. 3
Fig. 2
INVENTOR
ROY D. BLACK
BY
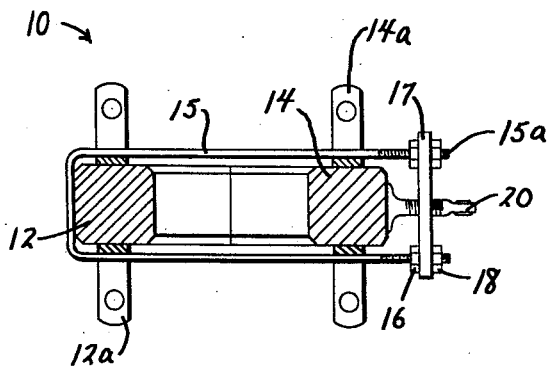
Attorney Jan. 22, 1963   R. D. BLACK   3,074,182
EDUCATIONAL DEVICES
Filed Sept. 14, 1959   5 Sheets-Sheet 2
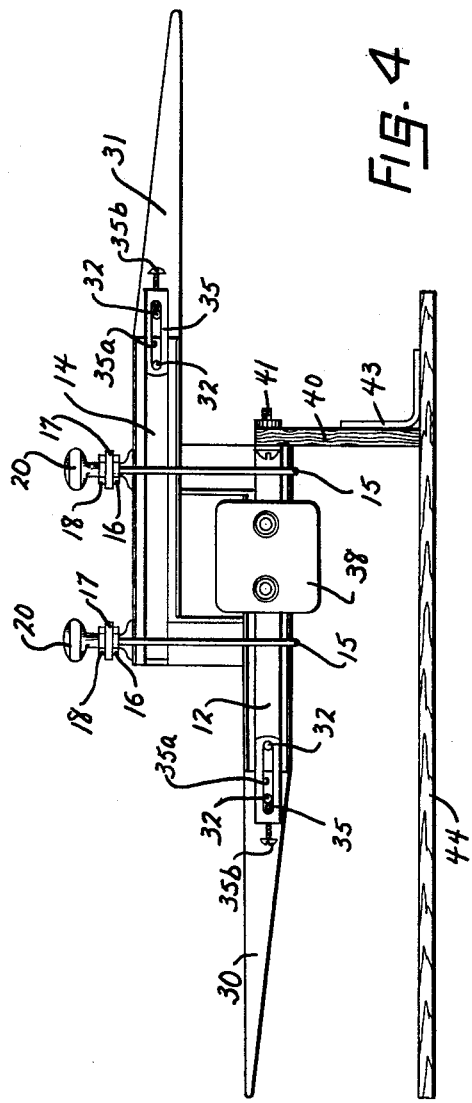
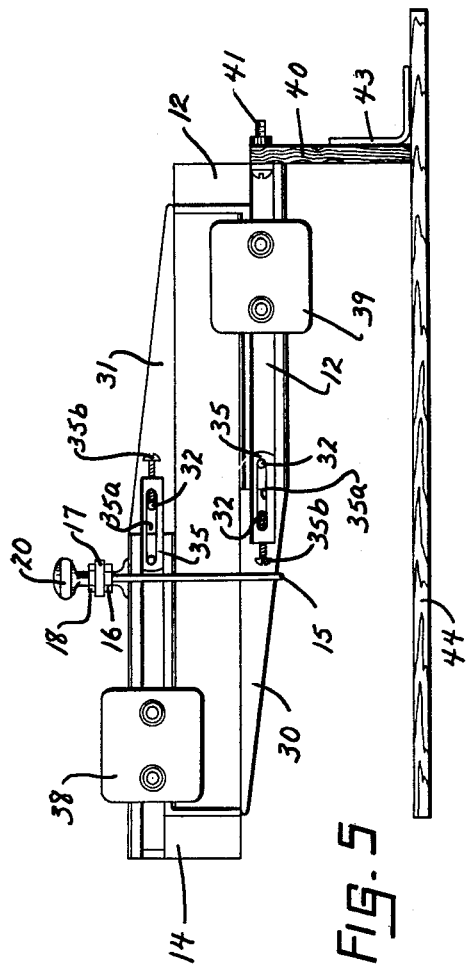
INVENTOR
ROY D. BLACK
BY
Warren D. Hackbert
Attorney Jan. 22, 1963   R. D. BLACK   3,074,182
EDUCATIONAL DEVICES
Filed Sept. 14, 1959   5 Sheets-Sheet 3
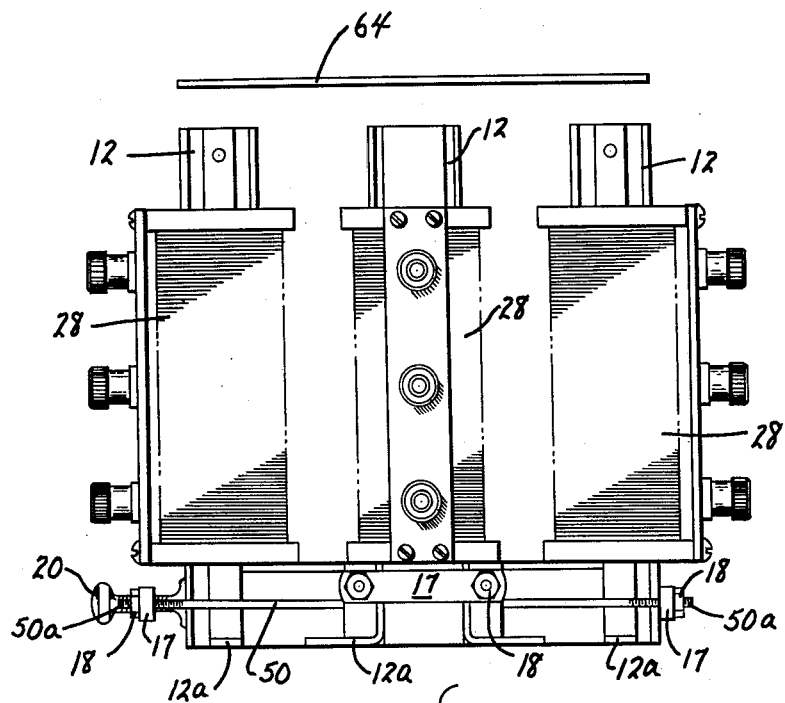
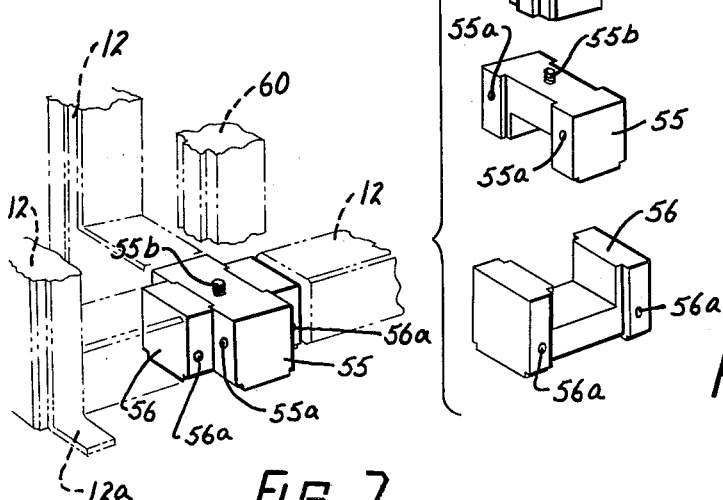
INVENTOR
Roy D. Black
BY
Warren D. Hackbert
Attorney

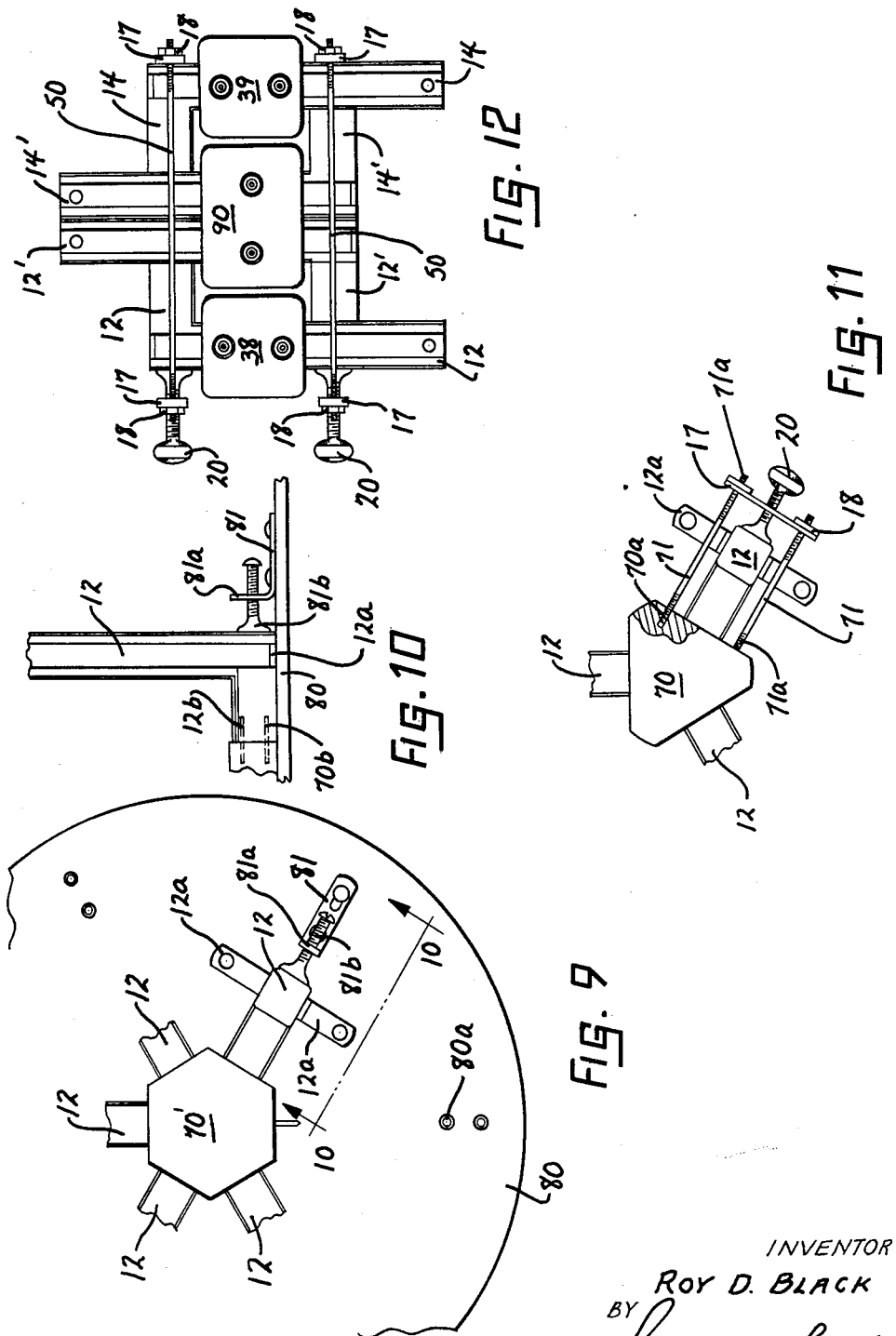

Jan. 22, 1963

R. D. BLACK 3,074,182

EDUCATIONAL DEVICES

Filed Sept. 14, 1959

INVENTOR.
ROY D. BLACK
BY
*Warren D. Hackbert*
Attorney

United States Patent Office 3,074,182
Patented Jan. 22, 1963

3,074,182
EDUCATIONAL DEVICES
Roy D. Black, Wabash, Ind., assignor to
Leonard R. Crow, Vincennes, Ind.
Filed Sept. 14, 1959, Ser. No. 839,719
8 Claims. (Cl. 35—19)

The present invention relates to educational devices, and more particularly to educational devices having generally standardized components capable of rearrangement and re-grouping to demonstrate a wide variety of electromagnetic phenomena.

As is well-known, it is highly desirable to demonstrate various electromagnetic results in conjunction with either classroom, individual or even self-training in the field of electricity and magnetism. Heretofore, in view of the complexity of existing structures as well as money considerations, little or no effort has been directed to developing the necessary versatile laboratory demonstration equipment. Moreover, in addition to the aforestated objections to the available instructional units, the latter were oftentimes inherently incapable of proper demonstration of more than a single phenomena, thereby diminishing any effective complete utilization thereof.

By virtue of the instant invention, the applicant has provided for novel educational devices having basic components which are readily interchangeable, as desired, to afford a wide variety of demonstration units for teaching various electrical and magnetic phenomena. The aforementioned objective is achieved through the use of an improved type of electro-mechanical core, which, together with other components, permits the ready assembly of a multitude of devices, and thereby avoids the expense which would otherwise be necessary to purchase and/or construct the equivalent number of individual devices.

The applicant's invention comprises a number of individual components which are simple and economical to manufacture and readily grouped in kit form to provide a convenient basis for electromagnetic phenomena demonstration purposes.

Accordingly, the principal object of the present invention is to provide for the assembly of a plurality of novel educational devices from a basic number of individual components.

A further object of the present invention is to provide a multiplicity of educational training aids which are readily assembled from certain basic components, and which may be quickly disassembled for serving alternate or substitute purposes.

A still further and yet more general object of the present invention is to provide for versatile laboratory demonstration equipment capable for use in conjunction with instruction of various phenomena in the field of electricity and magnetism.

Other objects and a better understanding of the invention will become more apparent from the following description, taken in conjunction with the accompanying drawings, wherein FIG. 1 is a view in front elevation, partly broken away, showing a typical core structure in accordance with the teachings of the instant invention;

FIG. 2 is a view in horizontal section taken at line 2—2 of FIG. 1 and looking in the direction of the arrows, showing details of assembling the core structure of FIG. 1;

FIGS. 3, 4, 5 and 6 are alternate demonstration units in accordance with the teachings of the instant invention;

FIG. 7 is a detailed view of a portion of the demonstration unit of FIG. 6, with some of the core members therefor being shown in phantom lines;

FIG. 8 is an exploded view of the heavy line structure of FIG. 7, with a portion of a core normally positioned thereon also being disclosed;

FIG. 9 is a plan view, partially fragmentary, showing stil another demonstration unit in accordance with the teachings of the instant invention;

FIG. 10 is a view in side elevation, partially fragmentary, taken at line 10—10 of FIG. 9 and looking in a direction of the arrows, showing assembly details for one of the core members;

FIG. 11 is a plan view, mostly fragmentary, showing yet another demonstration unit in accordance with the teachings of the instant invention, with the particular assembly structure therefor being detailed;

FIG. 12 is a view in front elevation showing still a further demonstration unit in accordance with the teachings of the instant invention.

Figure 13:
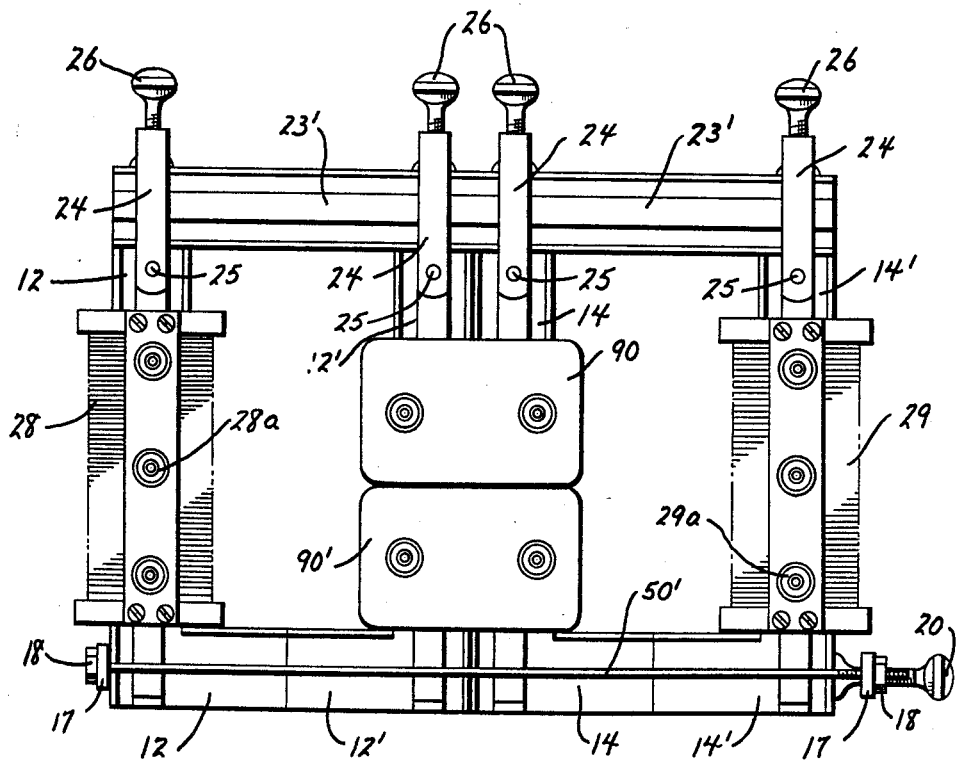
FIG. 13 is a view in front elevation showing still a further demonstration unit in accordance with the teachings of the instant invention.

For the purposes of promoting an understanding of the principles of the invention, reference will now be made to the embodiments illustrated in the drawings and specific language will be used to describe the same. It will nevertheless be understood that no limitation of the scope of the inventions is thereby intended, such alterations and further modifications in the ilustrated devices, and such further applications of the principles of the inventions as illustrated therein being contemplated as would normally occur to one skilled in the art to which the invention relates.

Referring now to FIGS. 1 and 2, a representative core structure 10 made in accordance with the instant invention comprises L-shaped core members 12 and 14 having stabilizing feet 12a and 14a for positioning the assembled unit, the core members 12 and 14 being retained in assembled relation through a U-type stirrup 15 which extends therearound adjacent the feet 12a and 14a, respectively, thereof. The U-type stirrup 15 has threaded ends 15a adapted to receive threaded nuts 16, as well as an end clamp 17 and other threaded nuts 18. A wing nut 20 extends through the end clamp 17 and, when in use, is adapted to engage a side surface of one of the cores, in this instance core 14, in a firm relationship.

In addition, the core members 12 and 14 are aligned by the use of pins 12b and 14b, respectively, extending therefrom and adapted to be received in complementary holes or recesses in the oppositely disposed core. The overall core structure 10 is completed by the use of an additional core member 23, which core member 23 is disposed on the end surfaces of the core members 12 and 14, respectively. U-straps 24 are provided to retain the core member 23 in operative position, with pins 25 extending through holes in the lower arms thereof and through the core members 12 and 14. Wing nuts 26 provide means for firmly positioning the U-straps 24 and, hence, the core member 23 thereon. Thus, it should be noted that the core structure 10 is secured in aligned assembled relationship both mechanically as well as magnetically.

With further reference to the core structure 10 of FIGS. 1 and 2, it should be noted that certain of the components thereof may be readily replaced to illustrate, for example, an increase in core reluctance. Such a modification would typically include the substitution of a longer core member 23, as well as the use of an additional core member between the lower end portions of core members 12 and 14 to provide a larger overall rectangular-like core structure. It would be necessary then, of course, to lengthen the U-type stirrups 15 to achieve a rigid relationship between the components when assembled for operation.

With reference to FIG. 3, a demonstration unit is disclosed therein which may be used as a simple transformer, with coils 28 and 29 representatively serving as the primary and secondary thereof, respectively. In this educational training unit, the L-shaped core members 12 and 14 are inverted so that the bases of each are not adjacent each other, but rather disposed at opposite ends of the assembled device. The coils 28 and 29 are then disposed around the elongated portion of the core members 12 and 14, respectively, with contacts 28a and 29a being provided thereon for connection to the electrical circuitry. The remainder of the educational training device is similar to that disclosed with reference to the structure of FIGS. 1 and 2, mainly, the use of U-type stirrups 15 with associated components for maintaining the demonstration unit in a firmly assembled relationship.

FIGS. 4 and 5 disclose further embodiments of the instant invention which are particularly valuable in demonstrating other phenomena in the field of electricity and magnetism. For example, in the structure of FIG. 4, the L-shaped core members 12 and 14 are so disposed with respect to each other that the elongated portions thereof may be extended by the use of core members 30 and 31, respectively. The core members 12 and 14, as well as the core members 30 and 31, are provided with holes adapted to receive pins 32 near the end surfaces thereof, with such pins 32 being adapted to be received by a clamp member 35 in an elongated slot 35a therein. Screw means 35b are provided on this clamping arrangement which, when positioned for use, exert a cooperating force between the pins 32 and, hence, retain the core members 12 and 14 and the core members 30 and 31 in operative position.

The assembly is further completed by the use of a coil 38 disposed on the elongated leg portion of the L-shaped core member 12, with the latter core member 12 being typically mounted on a support bracket 40 by means of nut and bolt arrangements 41 which extend through the feet 12a thereof. The support bracket 40 may be conventionally disposed on a workboard 44 through a conventional angle member 43.

The aforementioned demonstration unit of FIG. 4 provides an excellent means for illustrating resonance in alternating current circuits whereby graphs may be plotted as the inductance in the circuit is varied by taking voltage or current readings, or both, for various increments of core positions as the assembled core members 14 and 31 are slid longitudinally with respect to the assembled core members 12 and 30. The latter sliding action would be in the form of a movement from left to right in FIG. 4, with, of course, the U-type stirrups 15 being untightened to permit such movement and thereafter tightened for effective unit use. It should be understood that in demonstrating the aforesaid series resonance, the electrical circuitry would necessarily include a capacitor (not shown) in series with the coil 38.

With reference to the teaching unit disclosed by FIG. 5, the latter represents a further modification of the demonstration device of FIG. 4 whereby a second coil 39 is used with the aforedescribed structure. In this instance, one of coils 38 or 39 serves as a primary winding of a transformer, while the remaining coil serves as a secondary thereof. Accordingly, the embodiment of the invention disclosed by FIG. 5 is susceptible to a wide variation of output depending upon the longitudinal movement of the assembled core members 14 and 31 having coil 38 thereon with respect to the assembled core members 12 and 30 having coil 39 thereon. It should be noted that FIG. 5 shows the structure where a minimum output results, with a maximum output being achieved when the aforesaid components are positioned with respect to each other so that coil 38 is disposed immediately above coil 39.

It should be understood that effective results can also be obtained from a demonstration unit or units comparable to those disclosed by FIGS. 4 and 5, modified, however, to omit use of core members 30 and 31. For example, by such a change of structure as applied to the unit of FIG. 4, a single coil reactor can be effectively demonstrated through positions of maximum to minimum reluctance. With the structure of FIG. 5 so modified, and using the coils 38 and 39 as a primary winding and as a secondary winding, respectively, of a transformer, the wide variance of magnetic coupling between the windings, i.e., from a minimum to a maximum reluctance or vice versa, can be very effectively demonstrated. It should be further noted that the core members may be vertically positioned on the support member 40, as desired, for added versatility of the demonstration units.

With reference to FIGS. 6, 7 and 8, an educational training unit is disclosed which is particularly valuable in the study of levitators, i.e. means for causing conductive substances to float in a magnetic field. The training device comprises two pairs of L-shaped core members 12 secured together through clamping mechanisms, each of the latter including leg members 50 having threaded ends 50a, end clamps 17, threaded nuts 18, and a wing nut 20 for effective assembly.

Considering FIG. 7, the training unit of FIG. 6 includes central core members 55 and 56 which have an interlocking configuration, the latter being particularly apparent from the exploded view of FIG. 8. In use, the central core members 55 and 56 are assembled together in engaging relationship and the ends of the shorter leg portion of the L-shaped core members 12 are respectively disposed in contact therewith. The leg members 50 forming a part of the clamping mechanisms are then positioned through openings 55a and 56a in the central core members 55 and 56, respectively, and, in view of the use of end clamps 17 and wing nuts 20, the components are effectively and simply retained in an operative relation.

The overall teaching unit of FIGS. 6, 7 and 8 also includes a straight core member 60 centrally disposed with respect to the core members 12 and removably positioned on the central core member 55 by means of a threaded stud 55b which is received in a threaded hole in one of the end surfaces thereof. Two pairs of identical coils 28 are provided for use on the respective L-shaped core members 12 forming a part of this instructional device.

A conductive disk 64, preferably made from aluminum, is provided as the component to be levitated or floated in the magnetic field produced by the four coil combination. In use, and as generally noted hereabove, when the respective coils 28 are properly excited by alternating current, the conductive disk 64 floats above the ends of the core members 12 and 60, as particularly apparent from FIG. 6, to illustrate the phenomena of levitation.

FIGS. 9, 10 and 11 disclose details of other educational teaching units in accordance with the instant invention, which units further employ alternate means to maintain the components thereof in operative relation. The figures disclose representative configurations, in plan view, of a central core member, which, as illustrated, may be generally triangular, hexangular, or of any other suitable geometrical definition. For example, with reference to the structure of FIG. 11, the L-shaped core member 12 is shown disposed in operative relation to a triangular central core member 70, the latter structure including clamping mechanisms having legs 71 with threaded end portions 71a. The latter threaded end portions 71a of legs 71 are received in threaded openings 70a in the triangular central core member 70, with the opposite ends thereof engaging the particular clamping mechanism discussed hereabove in connection with the structure of FIG. 6. It should be understood that by exciting coils (not shown) disposed around the elongated body portion of the three L-shaped core members 12 with a three-phase current, a rotating magnetic field is produced about the upper ends of the latter.

It should be understood that when four L-shaped core members and corresponding coils are used with a central core member 70 having a generally square area in plan view, exciting the coils with a two-phase current or a split single phase current also produces a rotating magnetic field about the upper ends of the core members. Moreover, when a hexangular central core 70' member is employed, a very effective three phase structure is achieved through proper excitation of the six coils used therewith.

The applicant has also provided for a simplified teaching unit for demonstrating rotating magnetic field phenomena which does not use the separate central core member discussed hereabove in connection with the structure of FIG. 6. Instead, the L-shaped core members may be used in conjunction with a U-shaped core member, with the type of stirrup assemblies discussed hereabove in connection with FIGS. 1 and 2 extending through lateral openings in the U-shaped core member to permit ready assembly of the unit. The aforesaid unit effectively serves to produce a rotating magnetic field around the upper ends of the L-shaped core members thereof.

Considering the structures of FIGS. 9 and 10, the modification of the instant invention disclosed therein includes the use of a base member 80 having brackets 81 adjustably secured thereto, with holes 80a being provided in the base member 80 for receiving a various number of brackets 81 depending upon the educational training device desired. One end 81a of each of the brackets 81 is turned upwardly and is adapted to receive an adjustable screw type positioning member 81b which may be urged against the side surface of the L-shaped core member 12 (see FIG. 10) to retain the unit in an assembled condition. The components forming the teaching device may be further mechanically secured together by pins 70b and 12b which, for example, respectively extend from the central core member 70 and the L-shaped core members 12 into complementary openings in each.

As should be apparent, the abovedescribed clamping structure may be used in connection with a central core member 70 of any geometrical configuration in plan view. For example, FIG. 9 discloses a central core member 70 having a hexangular shape. Moreover, the central core member 70 may comprise two individual components for effective demonstration purposes.

With reference now to FIG. 12, another form of demonstration unit is disclosed which is useful for effectively demonstrating either a transformer or a reactor structure, for example. Again, as in connection with the other educational training devices discussed hereabove, the structure is formed from the common components used in all of the units formed in accordance with the instant invention. For example, in this structure, two pairs of L-shaped core members 12 and 14 and 12' and 14' are used in conjunction with three coils 38, 39 and 90. By movably positioning the core members 12 and 14 with reference to the core members 12' and 14', the overall reluctance of the device can be changed from a maximum to a minimum, and vice versa.

Moreover, and with reference now to FIG. 13, it should be understood that by using a straight core member 23' with pairs of L-shaped core members 12 and 12', and 14 and 14', an E-core structure may readily be obtained for further demonstration purposes in the field of electricity and magnetism. As should be apparent from the aforesaid figure, coils 28, 29, 90 and 90' are respectively disposed on the arms forming the E-core structure, where the leg members forming part of the clamping mechanisms in this instance are identified by the reference numeral 50'.

From the preceding, it should be apparent that the applicant has provided for various novel demonstration devices useful in teaching electrical and magnetic phenomena, which demonstration devices are readily assembled from a number of basic components, principally an L-shaped core member. The applicant's invention provides for a versatility in the field of educational devices which has been practically unknown heretofore, with the simple and relatively few basic elements providing for a wide range of instruction. The device affords practicability without undue expense, and at the same time easy and simplified assembly, either by an instructor or by an individual who is learning by correspondence at home away from a classroom.

The training devices described hereabove are susceptible to various changes within the spirit of the invention. For example, the training aids discussed in the instant application are actually representative of the many which are possibly assembled, with the latter being limited mainly to the instructor's study program. Individual components may, of course, be varied insofar as overall physical dimensions are concerned. Thus, the above description should be considered as illustrative and not as limiting the scope of the following claims.

I claim:

1. An educational electrical training aid in the form of an electromagnetic device comprising L-cores of magnetizable material so arranged together as to define a closed core path having a variable length, means releasably securing said L-cores together both mechanically and magnetically for changing the reluctance of said combined L-cores by the shifting of said L-cores relative to one another, and electromagnetic means for magnetically energizing said combined L-cores for demonstration of various electromagnetic principles and applications.

2. An educational electrical training aid in the form of an electromagnetic device comprising L-cores of magnetizable material, means detachably securing said L-cores together both mechanically and magnetically to form a U-core, a straight core section of magnetizable material adapted to span the pole ends of the said U-core to form a closed core structure, means detachably securing said straight magnetizable core section to said U-core, and electromagnetic means for magnetically energizing said core structure for demonstration of various electromagnetic principles and applications.

3. An educational electrical training aid in the form of an electromagnetic device comprising L-cores of magnetizable material, at least one other magnetizable core section disposed between said L-cores to form a closed core structure, means detachably securing said L-cores to said at least one other magnetizable core section both mechanically and magnetically, and electromagnetic means for magnetically energizing said closed core structure for demonstration of various electromagnetic principles and applications.

4. An educational electrical training aid in the form of an electromagnetic device comprising at least two pairs of L-cores of magnetizable material, one of said pairs of L-cores having legs disposed in a back-to-back relation, means releasably securing said at least two pairs of L-cores together both mechanically and magnetically for varying reluctance by the shifting of said pairs of L-cores relative to one another, and electromagnetic means for magnetically energizing said pairs of L-cores for demonstration of various electromagnetic principles and applications.

5. An educational training aid in the form of an electromagnetic device comprising L-cores and a U-core of magnetizable material, means detachably securing said L-cores and said U-core together both mechanically and magnetizally to form an open core structure, and electromagnetic means for magnetically energizing said core structure for demonstration of various electromagnetic principles and applications.

6. An educational electrical training aid in the form of an electromagnetic device comprising at least two pairs of L-cores of magnetizable material, at least two auxiliary core members of magnetizable material adapted to be crossed at right angles with respect to each other and to maintain the same average cross section of each when so crossed, means detachably securing said at least two pairs of L-cores to the said at least two auxiliary core members, a straight core of magnetizable material disposed on one of said crossed auxiliary core members and extending therefrom parallel to legs defining portions of said L-cores to form a core structure, and electromagnetic means for magnetically energizing said core structure for demonstration of various electromagnetic principles and applications.

7. An educational electrical training aid in the form of an electromagnetic device comprising at least two pairs of L-cores of magnetizable material arranged to form an E-core, a straight core of magnetizable material adapted to span across the pole ends of the said E-core to provide a closed core structure, means detachably securing said at least two pairs of L-cores and said straight core together both mechanically and magnetically, and electromagnetic means for magnetically energizing said closed core structure for demonstration of various electromagnetic principles and applications.

8. An educational training aid in the form of an electromagnetic device comprising L-cores of magnetizable material, a core member of magnetizable material detachably secured to a free end of each of said L-cores both mechanically and magnetically, means releasably securing the combined L-cores and core members together both mechanically and magnetically for varying reluctance by the shifting of one combined L-core and core member relative to another combined L-core and core member, and electromagnetic means for magnetically energizing said combined L-cores and core members for demonstration of various electromagnetic principles and applications.

References Cited in the file of this patent
UNITED STATES PATENTS

| | | |
|---|---|---|
| 1,697,401 | Nagy | Jan. 1, 1929 |
| 2,866,276 | Zumwalt | Dec. 30, 1958 |

FOREIGN PATENTS

| | | |
|---|---|---|
| 490,505 | Canada | Feb. 10, 1953 |
| 1,164,604 | France | May 19, 1958 |
| 344,961 | Great Britain | Mar. 19, 1931 |
| 440,877 | Great Britain | Jan. 8, 1936 |
| 209,399 | Switzerland | July 1, 1940 |